(12) United States Patent
Muneyoshi et al.

(10) Patent No.: US 8,144,382 B2
(45) Date of Patent: Mar. 27, 2012

(54) IMAGE DISPLAY DEVICE

(75) Inventors: Takahiko Muneyoshi, Higashiyamato (JP); Nobuaki Hayashi, Kunitachi (JP); Shoichi Uchino, Annaka (JP); Tomio Yaguchi, Sagamihara (JP); Akiko Iwata, Chiba (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 752 days.

(21) Appl. No.: 11/802,382

(22) Filed: May 22, 2007

(65) Prior Publication Data

US 2007/0279347 A1    Dec. 6, 2007

(30) Foreign Application Priority Data

May 31, 2006   (JP) ................. 2006-150865

(51) Int. Cl.
*G02B 26/02* (2006.01)
(52) U.S. Cl. ...................................... 359/228
(58) Field of Classification Search .......... 359/228, 359/296; 345/76–81
See application file for complete search history.

(56) References Cited

U.S. PATENT DOCUMENTS

| | | | | |
|---|---|---|---|---|
| 2001/0055080 A1* | 12/2001 | Naito et al. | ........ | 349/79 |
| 2005/0104804 A1* | 5/2005 | Feenstra et al. | ........ | 345/41 |
| 2007/0019006 A1* | 1/2007 | Marcu et al. | ........ | 345/690 |

FOREIGN PATENT DOCUMENTS

| | | |
|---|---|---|
| JP | 2004-226440 | 8/2004 |
| JP | 2005-172855 | 6/2005 |
| JP | 2005-189299 | 7/2005 |
| JP | 2005-221881 | 8/2005 |
| JP | 2005-275221 | 10/2005 |
| WO | WO 2006-000945 A1 | 1/2006 |

OTHER PUBLICATIONS

Robert A. Hayes, et al., "Video-Speed Electronic Paper Based on Electrowetting", Nature, vol. 425, Sep. 25, 2003; pp. 383-385.

* cited by examiner

*Primary Examiner* — Jennifer L. Doak
(74) *Attorney, Agent, or Firm* — Stites & Harbison, PLLC; Juan Carlos A. Marquez, Esq (57) ABSTRACT

The present invention enhances the repeatability of a low gray scale display of an image display device which uses oil layers. The enhancement of the repeatability of a low gray scale display can be realized by an image display device which includes a first insulation layer, a second insulation layer, a first oil layer which is arranged between the first insulation layer and the second insulation layer and, at the same time, is provided on a first insulation layer side, a second oil layer which is arranged between the first insulation layer and the second insulation layer and, at the same time, is provided on a second insulation layer side, first electrodes which are arranged outside the first insulation layer, and second electrodes which are arranged outside the second insulation layer.

17 Claims, 12 Drawing Sheets

IMAGE DISPLAY DEVICE

The present application claims priority from Japanese applications JP2006-150865 filed on May 31, 2006, the content of which is hereby incorporated by reference into this application.

BACKGROUND OF THE INVENTION

1. Field of the Invention

The present invention relates to an image display device which uses an oil layer as a shutter.

2. Description of the Related Art

At the present time, an image display device which arranges a large number of pixel shutters for changing light transmitting areas within pixels is attracting attentions because of advantageous effects thereof that the image display device exhibits the light utilization efficiency higher than the light utilization efficiency of an image display device which uses liquid crystal and a viewing angle dependency smaller than a viewing angle dependency of the image display device which uses liquid crystal.

Non-patent document 1 describes the constitution in which an oil layer which contains dye is arranged on a water layer on a water-repellant substrate, electrodes are mounted on a lower surface of the substrate, and the wettability of the water-repellant substrate is changed when a voltage is applied between the electrodes and water. That is, the non-patent document 1 describes that the movement of the oil layer containing dye is performed by opening/closing operations of one shutter and the opening/closing operation are controlled to change a light transmitting quantity of the pixel.

Non-patent Document 1: Nature, vol 425, pp 383-385

SUMMARY OF THE INVENTION

The conventional technique described in the non-patent document 1 controls, as described above, the light transmitting quantity of the pixel based on the opening/closing times of one shutter formed of the oil layer which contains dye. However, a response time (time of either one of the opening time and the closing time) of the shutter is late, that is, substantially 10 m/s.

The inventors of the present invention have found out that a low gray scale display can be realized by shortening the opening/closing times of the shutter, wherein a voltage is cut before the shutter achieves a full open state.

However, the shutter is operated by the movement of the oil layer and the fine movement of the oil layer exhibits poor repeatability and hence, the low gray scale display can not be accurately performed.

Accordingly, it is an object of the present invention to accurately perform a low gray scale display of an image display device which uses an oil layer.

To achieve the above-mentioned object, according to the present invention, each pixel of an image display deice which includes a plurality of pixels is configured to include a pair of electrodes and a plurality of oil layers which are sandwiched between the pair of electrodes. That is, the brightness of each pixel can be controlled by two shutters.

Further, as a specific constitutional example, the image display device includes a first insulation layer, a second insulation layer, a first oil layer which is arranged between the first insulation layer and the second insulation layer and, at the same time, is provided on a first insulation layer side, a second oil layer which is arranged between the first insulation layer and the second insulation layer and, at the same time, is provided on a second insulation layer side, first electrodes which are arranged outside the first insulation layer, and second electrodes which are arranged outside the second insulation layer.

As a method for allowing these two oil layers to function as two shutters, it may be possible to adopt a method in which timing at which an ON voltage is applied to one electrode and timing at which an OFF voltage is applied to another electrode are made different from each other. That is, by merely controlling the voltage applying timing, the brightness of the image display device can be adjusted.

Further, as a method for allowing the oil layers to effectively function as the shutters, it may be possible to adopt a method in which the oil layer contains dye. That is, by allowing either one or both of the above-mentioned pair of oil layers to contain the dye, more particularly, a light blocking dye, it is possible to further enhance functions of the oil layers as shutters.

Further, by providing the insulation layer between two oil layers, the oil layers are hardly mixed to each other.

Further, provided that the image display device includes the above-mentioned whole structure, by controlling a voltage which is applied to a pair of electrodes (a first electrode and a second electrode) arranged outside the insulation layers, it is possible to respectively independently drive two oil layers (a first and second oil layers) which contain light blocking pigment by way of the insulation layers (the first insulation layer and the second insulation layer). To be more specific, by applying an ON voltage to the first electrode, it is possible to move the first oil layer in the first direction (surface direction) parallel to the first insulation layer. By applying an OFF voltage to the second electrode, it is possible to move the second oil layer in the second direction (surface direction) parallel to the second insulation layer. Further, by bringing these two-layered oils in states opposite to each other (an open state and a closed state) and, further, by aligning the opening/closing operation directions of the oil layers with each other, and by allowing the first oil layer to perform the opening operation in advance to the closing operation of the second oil layer by a predetermined time, it is possible to increase or decrease a gap between the first oil layer and the second oil layer. That is, it is possible to perform a gray scale display of low brightness by decreasing the gap. Further, by adopting such a driving method, it is unnecessary for two oil layers to change moving directions thereof in a midst portion of the pixel, and the oil layers merely move between two states, that is, between a full open state and a full closed state. Accordingly, a display of low gray scale can be performed with high accuracy and high repeatability.

To explain the more specific control method, it is as follows.

(1) First black display mode (the first shutter being in a closed state and the second shutter being in an open state)

The first oil layer which contains light blocking pigment is brought into a state in which the first oil layer is spread in the whole pixel (a closed state, an OFF voltage applied state), and the second oil layer is brought into a state in which the second oil layer is not overlapped to at least a portion of the pixel (an open state, an ON voltage applied state).

(2) First white display (only the first shutter being operated in the opening direction and the second shutter being in an open state)

By applying an ON voltage to the first electrode, the first oil layer which covers the first insulation layer of the whole pixel is moved. Due to this movement of the first oil layer, a portion of the first insulation layer is not covered with the first oil layer. That is, a non-light-blocking region is generated. Here, the second electrode is brought into a state in which an ON voltage is applied to the second electrode.

(3) Second white display (the first shutter being operated in the opening direction and the second shutter being operated in the closing direction)

By applying an ON voltage to the first electrode, the first oil layer which covers the first insulation layer of the whole pixel is moved thus forming the non-light-blocking region, and by applying an OFF voltage to the second electrode, a light blocking region is formed at a portion of the formed non-light-blocking region.

(4) Third white display (the first shutter being in an open state and only the second shutter being operated in the closing direction)

By applying an ON voltage to the first electrode, the first oil layer is completely moved and is brought into a full open state, and by applying an OFF voltage to the second electrode, a formed light blocking region of the non-light-blocking region is spread.

(5) Second black display mode (the first oil layer being in an open state and the second shutter being in a closed state)

By applying an ON voltage to the first electrode, the first oil layer is completely moved and by applying an OFF voltage to the second electrode, the second oil layer which contains light blocking pigment is spread in the whole pixel (a closed state).

(6) Positions of the first oil layer and the second oil layer described in (5) are arranged opposite to positions thereof described in (1) and hence, by changing over timing at which data voltage is applied to the first electrode and timing at which the data voltage is applied to the second electrode or by performing the application of a voltage described in (1) during a period until the voltage which corresponds to signal data in a next frame is applied and during the period in which a light source such as a backlight is turned off, the positions of the first oil layer and the second oil layer are arranged at positions described in (1). The latter is a refreshing operation. Here, when the above-mentioned timings are reversed, even when the display mode is the black display mode, the timing at which ON voltage is applied to the first electrode and timing at which an OFF voltage is applied to the second electrode substantially coincide simultaneously, and the oil layers are moved while holding the light blocking state.

Further, also when the image display device is started, the above-mentioned refreshing operation is performed. Accordingly, a screen can immediately assume a standby state in which a next image display can be performed immediately while holding the black display (standby state) on the screen.

Further, as another means, a following constitution may be adopted. By arranging the first oil layer between the first insulation layer and the second insulation layer, by arranging the second oil layer between the second insulation layer and a third insulation layer and by arranging the electrodes outside these insulation layers, these oil layers may be driven independently. By housing these two oil layers in the inside of cells separately, it is possible to prevent the oil layers from being mixed to each other attributed to an impact or the like.

Further, by arranging the first oil layer of one pixel and the second oil layer of the neighboring pixel in a state that the first oil layer and the second oil layer are overlapped to each other or by controlling the movements of the first oil layer and the second oil layer, it is possible to narrow a pixel pitch. As a result, a numerical aperture of the pixel is enhanced and hence, it is possible to realize bright image display deice.

The pixels which are explained heretofore function as the light shutters and hence, it is preferable to provide a reflector (or a white diffusion plate) and a backlight outside the insulation layer which is arranged on a back surface of the display surface or to provide color filters on a front surface of a light modulation element.

Further, it is also preferable to arrange a backlight having a wavelength from a near ultraviolet region to an ultraviolet region on a back surface side of the light modulation element and to arrange color conversion filters which contain an organic light emitting material on a front surface of the light modulation element. Further, it is preferable to apply the organic light emitting material by coating using a wet method including an inkjet printing method or a screen printing method. This is because that, when the organic light emitting material is applied by coating using the wet method, the image display device can be easily large-sized compared to a case that the light emitting material is applied using a vacuum vapor deposition method and, at the same time, the image display device can be manufactured at a low cost. Further, it is preferable to arrange ultraviolet-ray absorbing films on front surfaces of the color conversion filters. This is because that the ultraviolet-ray absorbing films can absorb the ultraviolet rays harmful to human bodies.

According to the present invention, it is possible to realize an accurate display of low gray scales of the image display device which uses the oil layers.

DESCRIPTION OF THE PREFERRED EMBODIMENTS

Hereinafter, embodiments according to the present invention are explained.

Embodiment 1

Figure 13:
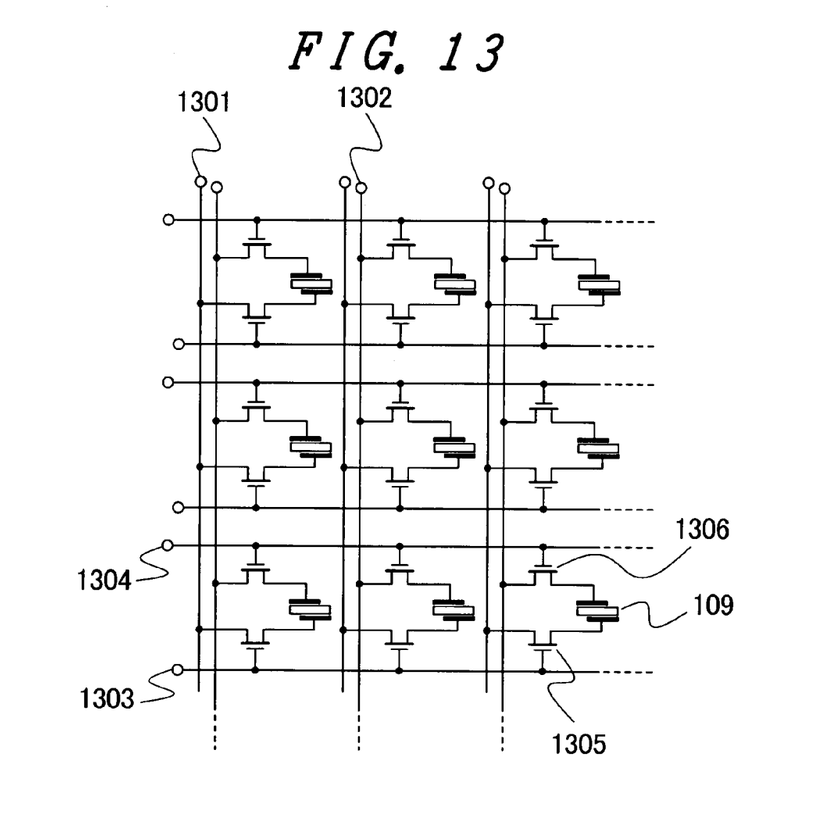
FIG. 13 is a circuit diagram of one example of the circuit constitution for driving the light modulation element according to the present invention.

FIG. 13 is a circuit diagram of one example of a circuit constitution for driving light modulation elements according to the present invention.

In the present invention, active elements of pixels are mounted on surfaces of a pair of substrates (a first substrate and a second substrate) which face each other. FIG. 13 is a circuit constitutional view of an equivalent circuit which expresses the above-mentioned constitution in plane.

In the circuit of the present invention, data lines 1301, 1302 are arranged in order in the vertical direction. Further, first selection lines 1303 and second selection lines 1304 are arranged in order in the horizontal direction. A first data latch TFT 1305 and a second data latch TFT 1306 which are connected to the above-mentioned four kinds of lines and drive a light modulation element 109 are arranged in each pixel. Each light modulation element 109 of the present invention includes a pair of electrodes which are formed on substrates different from each other, and the light modulation elements 109 are arranged in a matrix array within an effective display region.

The above-mentioned first data lines 1301, first selection lines 1303, first data latch TFT 1305 and one electrodes (the first pixel electrodes) of the light modulation elements are formed on the first substrate. The above-mentioned second data lines 1302, second selection lines 1304, second data latch TFTs 1306 and another electrodes (the second pixel electrodes) of the light modulation elements are formed on the second substrate.

Sources of the first data latch TFT 1305 are connected to the first data lines 1301, gates of the first data latch TFTs 1305 are connected to the first selection lines 1303 and drains of the first data latch TFTs 1305 are connected to the first electrodes.

Sources of the second data latch TFTs 1306 are connected to the second data lines 1302, gates of the second data latch TFTs 1306 are connected to the second selection lines 1304 and drains of the second data latch TFTs 1306 are connected to the second electrodes.

Figure 14:
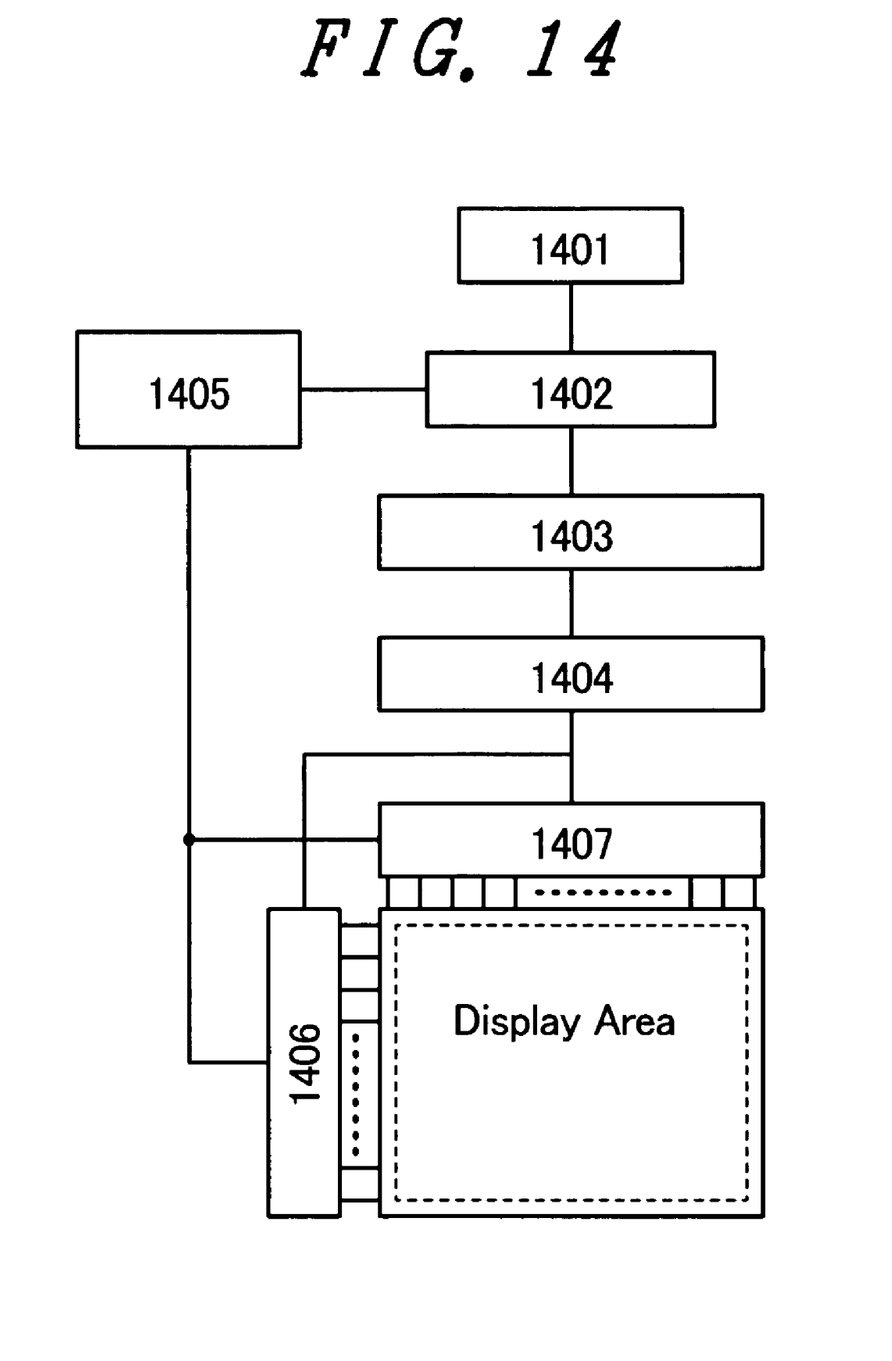
FIG. 14 is a block diagram for explaining one example of a flow of a driving of the image display device according to the present invention.

FIG. 14 is a block diagram for explaining one example of the flow of driving of the image display device according to the present invention.

An image signal 1401 which is input from an external device is temporarily stored in a buffer memory 1402. Here, when the input signal is an analog signal, the image signal 1401 is subjected to an analog-to-digital modulation. The converted image signal is stored in the buffer memory 1402 as a digital value at an address corresponding to a pixel position which is obtained based on a horizontal synchronizing signal and a vertical synchronizing signal. A gray scale data which indicates the brightness of the respective pixels to be displayed is calculated in a gray scale data generating part 1403 based on the digital value in the inside of the buffer memory 1402 which is obtained from the input signal.

In a drive data generating part 1404, timing corresponding to the gray scale is generated as V-based drive data based on the gray scale data and is supplied to an H-based driver 1407 and a V-based driver 1406. Here, this timing is constituted of timing at which an ON voltage is written by way of the first data latch TFT 1305, timing at which an OFF voltage is written by way of the first data latch TFT 1305, timing at which an ON voltage is written by way of the second data latch TFT 1306, and timing at which an OFF voltage is written by way of the second data latch TFT 1306.

The V-based driver 1406 references the timing signal from the timing generating part 1405 and the V-based drive data and supplies pulse waves which are selection signals to the selection lines 1303, 1304 at the timing which the V-based drive data indicates. Here, due to a time difference between timing at which an ON voltage is written via the first data latch TFT 1305 and timing at which an OFF voltage is written via the second data latch TFT 1306, a display of a low gray scale can be performed. Further, a period until an OFF voltage is written via the first data latch TFT 1305 after an ON voltage is written via the first data latch TFT 1305 and a period until an ON voltage is written via the second data latch TFT 1306 after an OFF voltage is written via the second data latch TFT 1306 are set substantially equal to each other. Along with the increase of the periods, the brightness can be increased thus realizing a multiple gray scale display.

The H-based driver 1407 references the timing signal from the timing generating part 1405 and timing at which the V-based drive data is written and supplies an ON voltage and an OFF voltage to the data lines 1301, 1302 at the timing synchronized with the selection signal.

Figure 1:
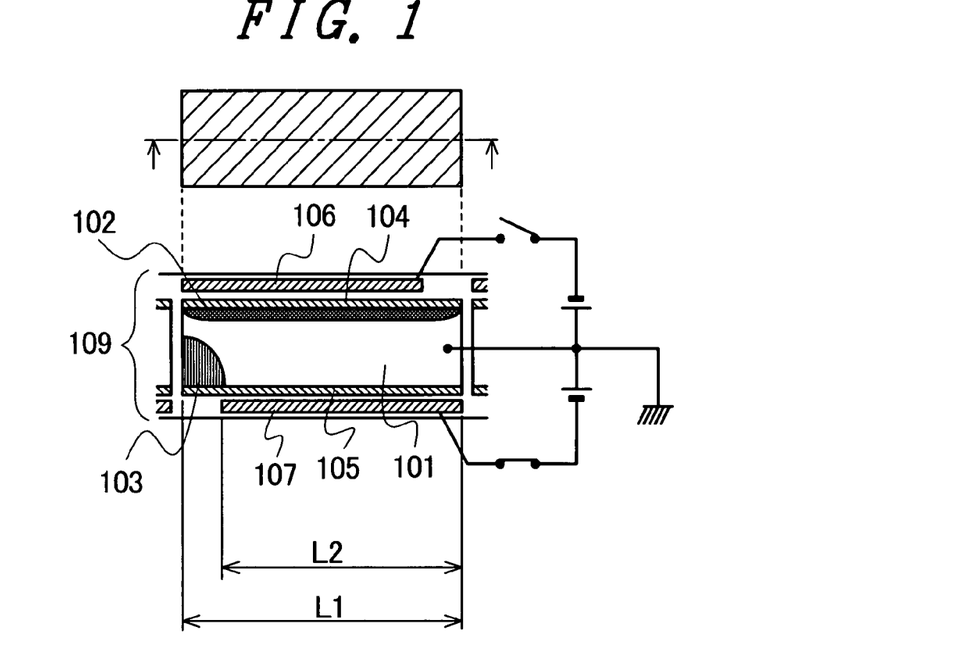
FIG. 1 is a view showing the cross-sectional structure of a light modulation element which constitutes one pixel and positions of oil layers as viewed from a display surface side.

FIG. 1 is a view showing the cross-sectional structure of a light modulation element which constitutes one pixel and a position of an oil layer as viewed from a display screen side.

The light modulation element 109 includes oil layers (a first oil layer and a second oil layer) 102, 103, and a water layer 101. The oil layers 102, 103 are respectively arranged close to transparent electrodes (a first pixel electrode and a second pixel electrode) 106, 107 by way of water-repellant walls (a first insulation layer and a second insulation layer) 104, 105. Here, the water-repellant walls 104, 105 have insulation properties and hence, a gap between the transparent electrodes 106, 107 and the oil layers 102, 103 is electrically insulated. The oil layers 102, 103 respectively contain dye so as to impart the light blocking properties to the oil layers 102, 103.

As shown in FIG. 1, in a state that a voltage is not applied to the transparent electrode 106, the oil layer 102 which is a nonpolar material is spread on the water-repellant wall 104. However, when a voltage is applied to the transparent electrode 107, due to the polarization, a surface of the water-repellant wall (the second insulation layer) 105 exhibits the affinity with water which is a polar material higher than the affinity of the surface of the water-repellant wall (the second insulation layer) 105 with the oil which is a nonpolar material. Accordingly, the oil layer 103 is forced to move to a corner of the pixel and is shrunken. Here, when the element is observed from the display screen side, the oil 102 which contains dye is spread in the element and hence, light can not pass through the inside of the element whereby the pixel assumes a black display state. That is, the first shutter is in a full closed state and the second shutter is in a full open state.

Figure 2:
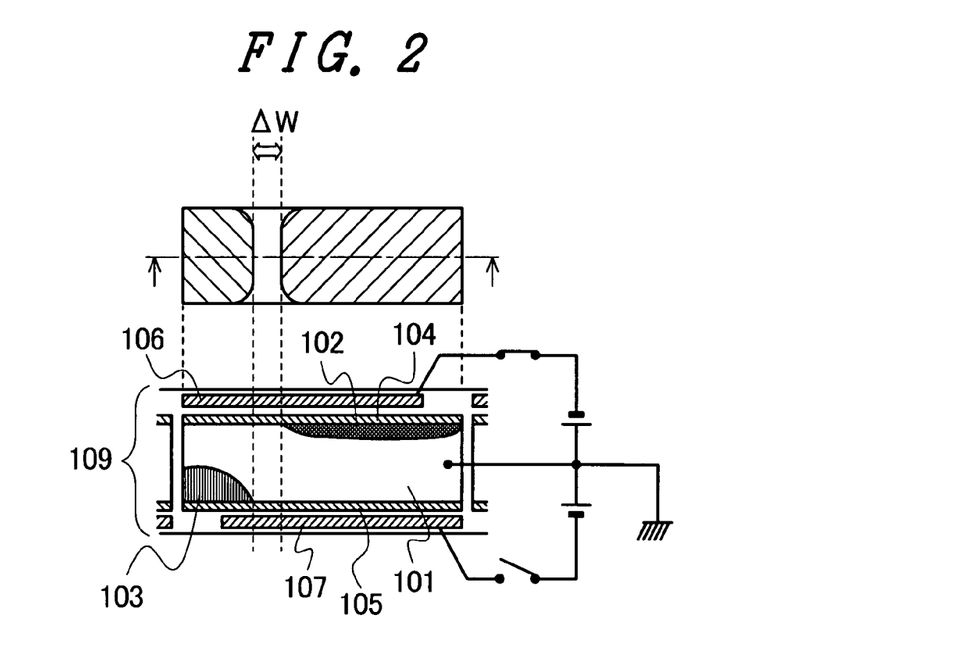
FIG. 2 is a view showing the cross-sectional structure of the light modulation element which constitutes one pixel and positions of oil layers as viewed from a display surface side.
Figure 3:
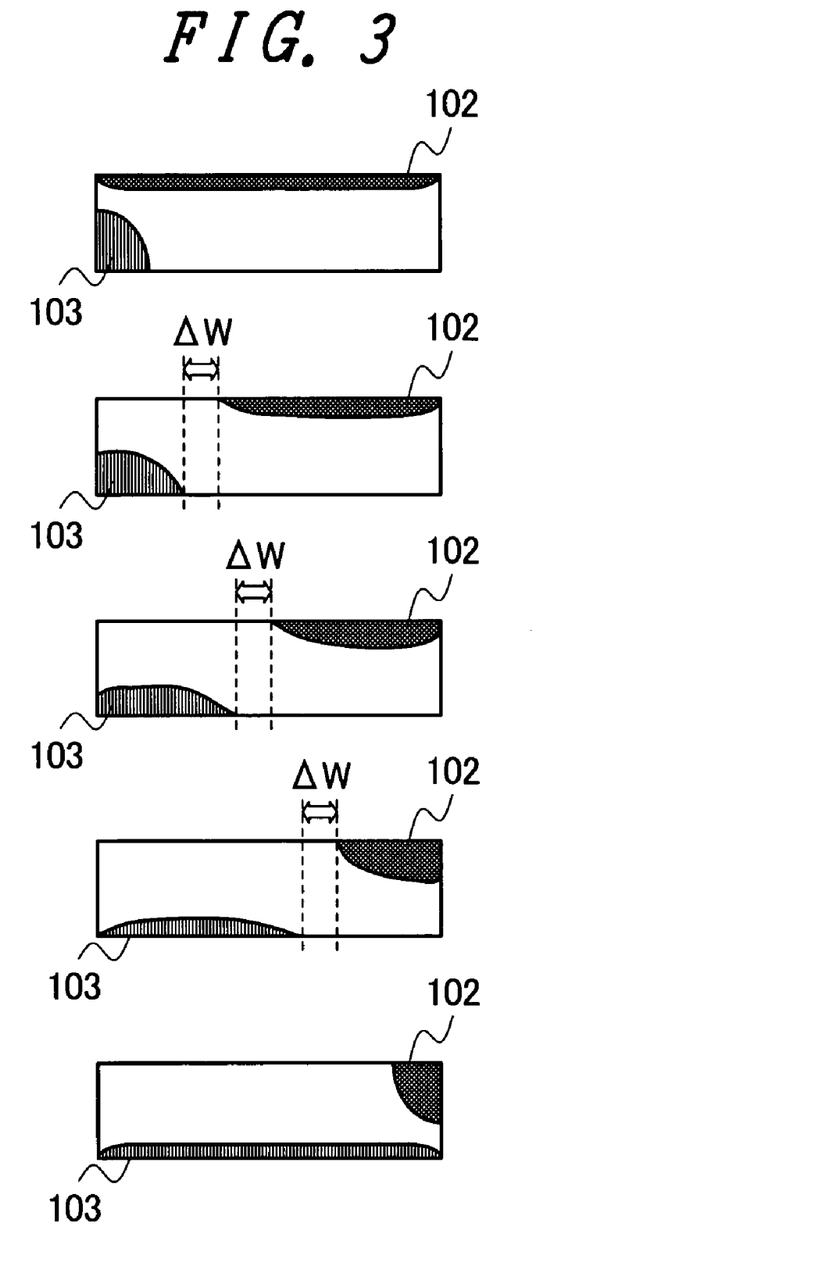
FIG. 3 is a view showing moving states of the oil layers using the cross-sectional structure of the light modulation element which constitutes one pixel.
Figure 4:
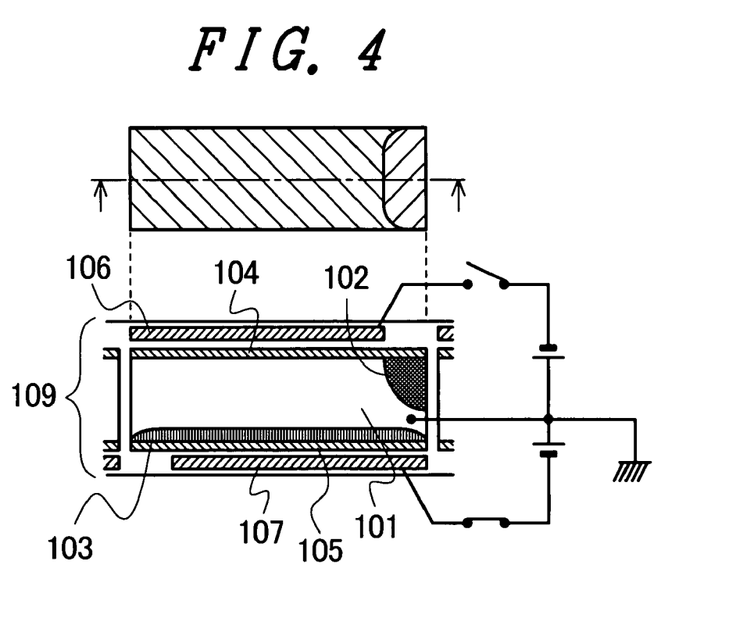
FIG. 4 is a view showing the cross-sectional structure of the light modulation element which constitutes one pixel and positions of oil layers as viewed from a display surface side.

FIG. 2 and FIG. 4 are views showing the cross-sectional structure of the light modulation element which constitutes one pixel and the positions of the oil layers as view from the display screen side. FIG. 3 is a view showing a moving state of the oil layers in conjunction with the cross-sectional structure of the light modulation element which constitutes one pixel.

As shown in FIG. 2, when a voltage is continuously applied to the transparent electrode 106, the oil 102 starts to shrink toward one side of the pixel which is a retracting position of the oil 102. That is, the first shutter is operated to assume an open state and the second shutter is in a full open state.

When the voltage applied to the transparent electrode 107 is cut after a predetermined time Δt is elapsed, the oil 103 which is retracted to another side (a side opposite to a side which is the retracting position of the oil 102) of the light modulation element 109 starts to spread on the water-repellant wall 105. At that time, light passes through a Δw which is a gap between the oil 102 containing dye and the oil 103. Here, the behaviors of the oil 102 and the oil 103 are shown in FIG. 3. While the oil 102 shrinks toward the retracting position, the oil 103 spreads and hence, the Δw which is a gap between the oil 102 and the oil 103 is moved with time in a state that the gap Δw traverses the inside of the element. That is, the first shutter is operated to provide an open state and the second shutter is operated to provide a shielding state. Further, by shielding a portion of the open portion of the first shutter using the second shutter, an open area is controlled. Then, the open portion is moved.

As a final state, as shown in FIG. 4, the oil 102 shrinks and the oil 103 spreads on the water-repellant wall 105. Here, when the pixel is observed from the display screen side, the oil 103 which contains dye spreads in the pixel and hence, light can not pass through the inside of the light modulation element 109 whereby the pixel exhibits a black display state. That is, the first shutter is in a full open state and the second shutter is in a full closed state.

A size of the gap Δw between the oil 102 and the oil 103 shown in FIG. 2 can be changed by adjusting the time difference Δt between timing at which the voltage is applied to the transparent electrode 106 and timing at which the voltage applied to the transparent electrode 107 is cut. Accordingly, it is also possible to change a quantity of light which passes through the inside of the light modulation element.

Figure 5:
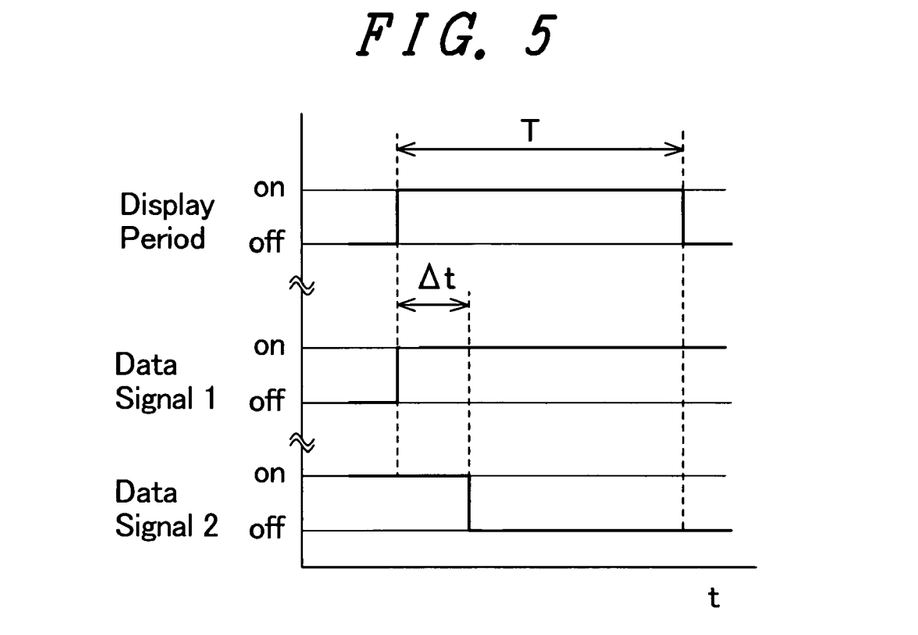
FIG. 5 is a view showing one example of a relationship between a display cycle T and a time difference $\Delta t$.

FIG. 5 is a view showing one example of a relationship between a display cycle T and the time difference Δt.

The display cycle, for example, corresponds to a display time of one frame when a frame display method is adopted, and corresponds to time for one line scanning when a line scanning method is adopted. To explain the display cycle, by taking a case shown in FIG. 2 as an example, a data signal 1 in FIG. 5 indicates a signal which is applied to the electrode 106 for driving the oil 102, and a data signal 2 indicates a signal which is applied to the electrode 107 for driving the oil 103. Here, FIG. 5 shows that voltages are applied to the electrode 106 and the electrode 107 when both of data signals 1, 2 assume an ON state. However, the voltages take a plus value or a minus value depending on properties of the oils 102, 103 and the water-repellant walls 104, 105.

In FIG. 5, when the data signal 1 assumes the ON state, the oil 102 starts to shrink, and when the data signal 2 assumes an OFF state, the oil 103 starts to spread. The gap Δw between the oil 102 and the oil 103 can be changed based on the time difference Δt between a time in which the data signal 1 assumes the ON state and the time in which the data signal 2 assumes the OFF state and hence, it is also possible to change the quantity of light which passes through the inside of the element.

Figure 6A:
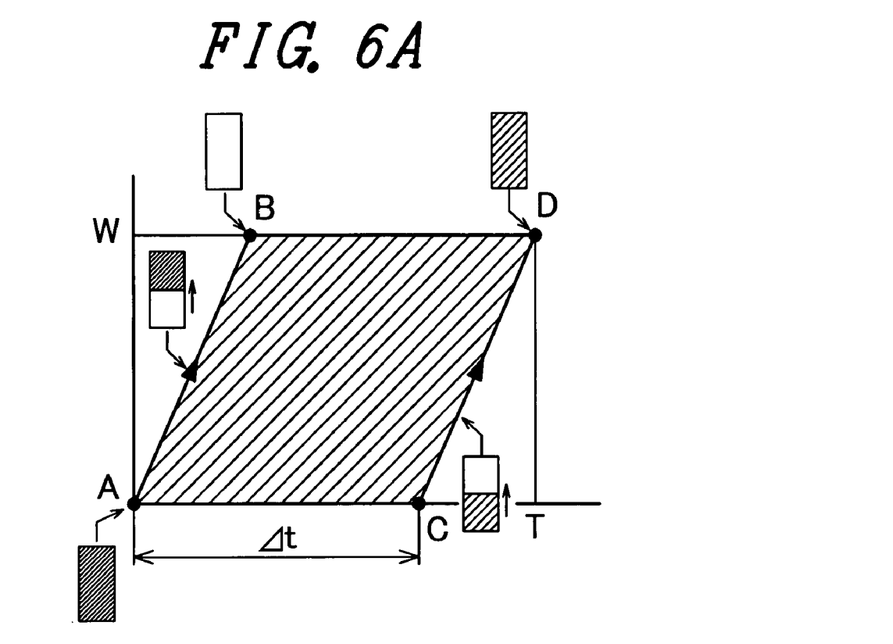
FIG. 6A and FIG. 6B are views for explaining a method for performing a gray scale display of the light modulation element which is used in the image display device according to the present invention.
Figure 6B:
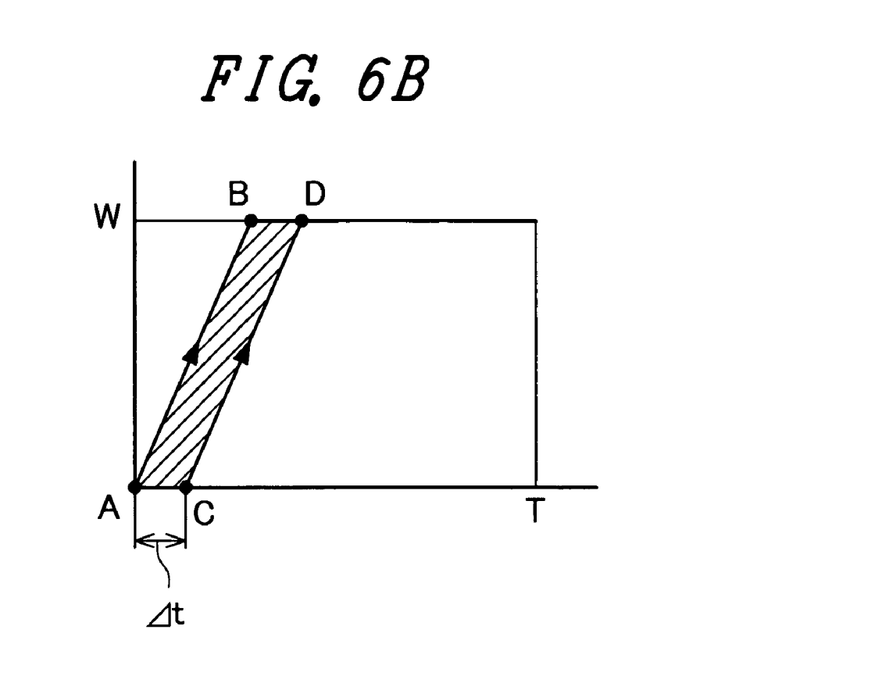

FIG. 6A and FIG. 6B are views for explaining a method for performing a gray scale display of the light modulation element used in an image display device according to the present invention. In FIG. 6A and FIG. 6B, time is taken on an axis of abscissas and symbol T indicates the display cycle. A distal end position of the moving oil is taken on an axis of ordinates, and symbol W indicates a pixel width.

To explain the gray scale display method by taking a case which adopts the structure shown in FIG. 1 as an example, in FIG. 6A, symbol A indicates a point of time at which the oil 102 starts to shrink and symbol B indicates a point showing a state that the oil 102 shrinks completely. Next, symbol C indicates a point of time at which the oil 103 starts to spread, and symbol D indicates a point showing a state that the oil 103 completely spreads in the inside of the element. That is, a parallelogram area which is surrounded by the points A, B, C and D indicates a quantity of light which passes through the inside of the element. Accordingly, it is understood that by setting the time difference Δt between the point A and the point C to a small value, as shown in FIG. 6B, the gray scale display can be performed in a low-brightness range.

Figure 7A:
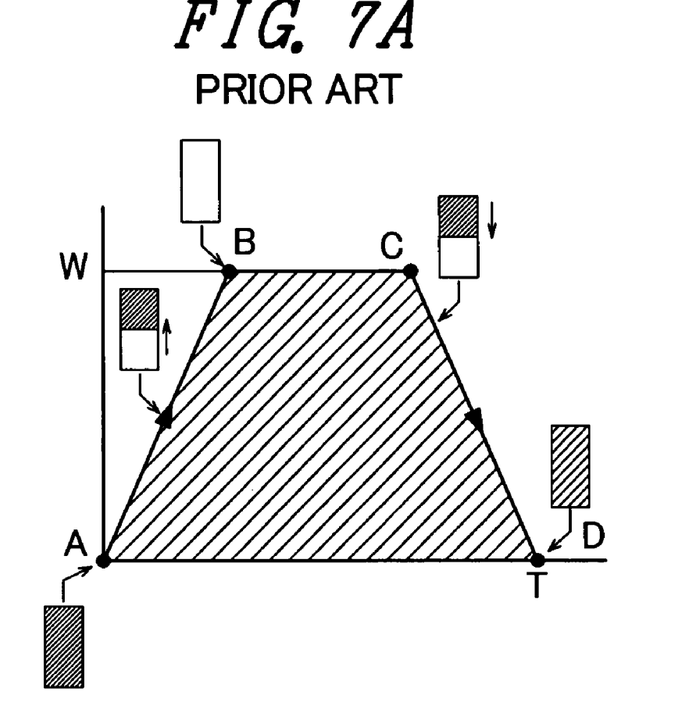
FIG. 7A and FIG. 7B are views for explaining gray scale display according to a conventional example.
Figure 7B:
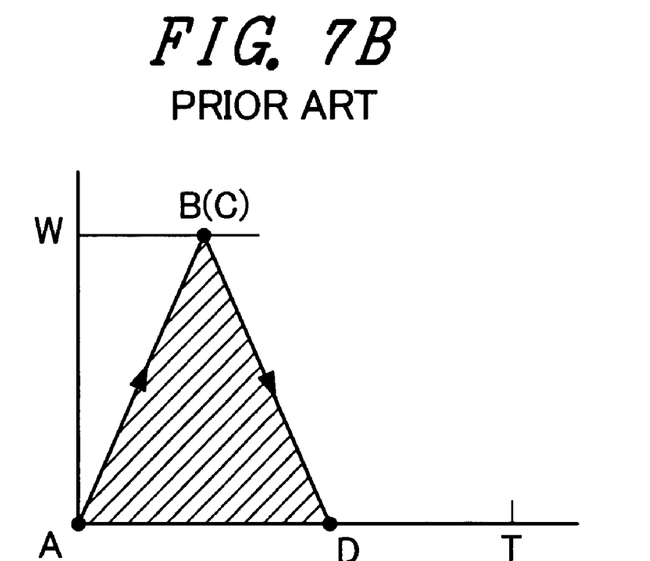

FIG. 7A and FIG. 7B are views for explaining a gray scale display according to a conventional example.

Conventionally, the light blocking is performed using single oil layer and hence, as shown in FIG. 7A, the oil starts to shrink at a point A and the oil shrinks completely at a point B. Next, the shrunken oil starts to spread again at a point C and the oil completely spreads on the pixel at a point D. Accordingly, a trapezoidal area which is surrounded by the points A, B, C and D indicates a quantity of light which passes through the inside of the element. In this case, to perform a display in the low brightness range, a time between the point B and the point C is adjusted. However, as shown in FIG. 7B, even when the time between the point B and the point C is set to zero, that is, even when the gray scale display with the lowermost brightness is performed, a quantity of light corresponding to an area surrounded by a triangle ABD passes through the inside of the element and hence, the low brightness display can not be performed sufficiently. The present invention overcomes the drawback of the prior art shown in FIG. 7A and FIG. 7B by adopting the constitution shown in FIG. 6A and FIG. 6B.

Here, in FIG. 1, to retract the oils 102, 103 to predetermined positions, it is necessary to set a size L2 of the transparent electrodes 106, 107 smaller than a size L1 of the water-repellant walls 104, 105. Further, to perform the gray scale display using the time difference between the drive start time of the oil 2 and the drive start of the oil 3, it is necessary to respectively arrange the retracting places of the oil 102 and the oil 103 at positions opposite to each other in the inside of the light modulation element 109.

Embodiment 2

Figure 8:
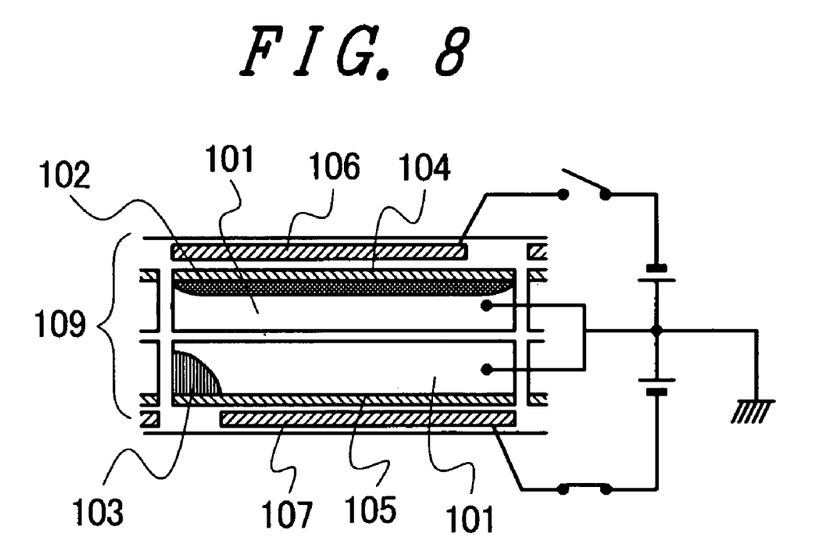
FIG. 8 is a view showing another constitution of the light modulation element which is used in the image display device according to the present invention.

FIG. 8 is a view showing another constitution of the light modulation element which is used in the image display device according to the present invention.

A point which makes this embodiment different from the embodiment 1 lies in that oil 102 and oil 103 are respectively and separately accommodated in different cells in a light modulation element 809. Further, other constitutions in this embodiment are exactly as same as the corresponding constitutions of the embodiment 1. That is, by partitioning the light modulation element 809 using an insulation member, it is possible to eliminate a possibility that the oil 102 and the oil 103 are mixed to each other attributed to a strong impact form the outside or the like.

Embodiment 3

Figure 9:
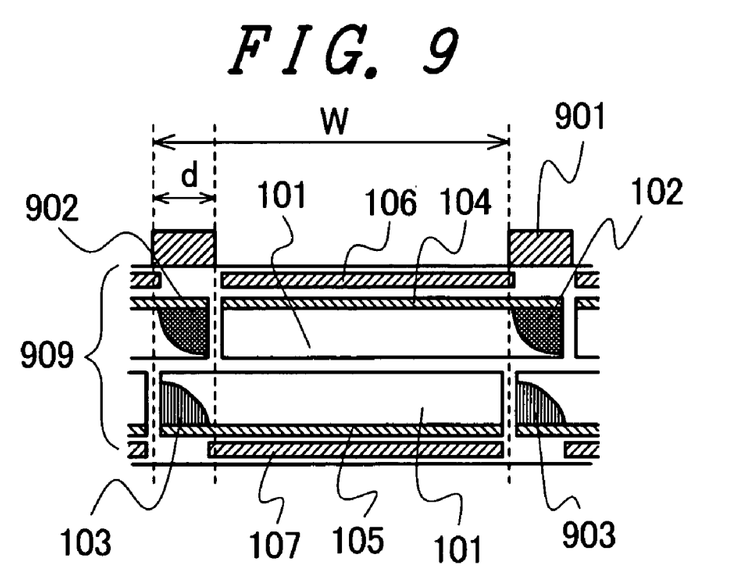
FIG. 9 is a view showing another constitution of the light modulation element which is used in the image display device according to the present invention.

FIG. 9 is a view showing another constitution of the light modulation element which is used in the image display device according to the present invention.

A point which makes this embodiment 3 different from the embodiment 2 lies only in that in a light modulation element 909, retracting places of oils 102, 103 are respectively vertically overlapped to retracting places of oils 903, 902 in neighboring pixels, and a black matrix 901 is arranged on the retracting places. Due to such a constitution, it is possible to set a size d of the retracting places of the oils 102, 103, 902, 903 to a small value with respect to a size W of the pixel thus realizing the acquisition of a bright screen.

Manufacturing Method of Light Modulation Element in Embodiments 1 to 3

The manufacturing method of light modulation element of the embodiments 1 to 3 is explained. A manufacturing process of the black matrix in the embodiment 3 is omitted.

Figure 16A:
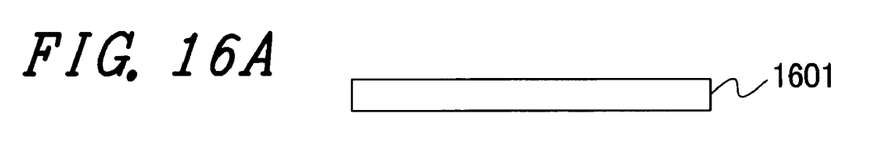
FIGS. 16a-16j are flowcharts for explaining one example of a manufacturing method of the light modulation element according to the present invention.
Figure 16B:
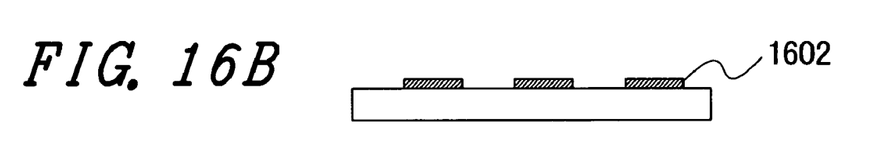
Figure 16C:
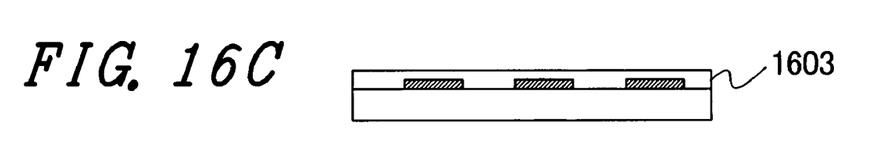
Figure 16D:
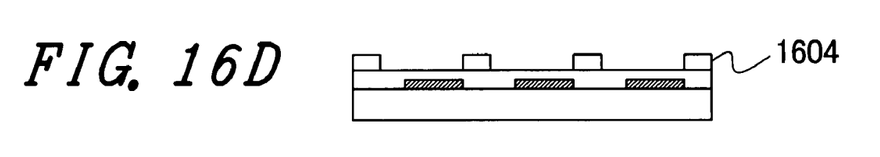
Figure 16E:
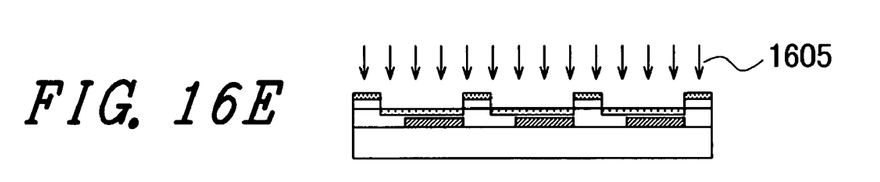
Figure 16F:
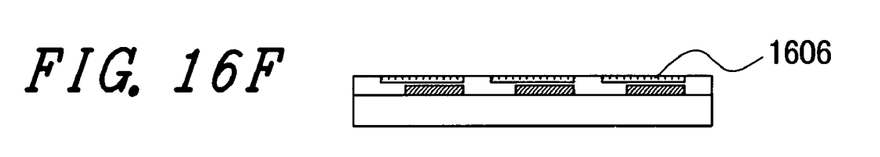
Figure 16G:
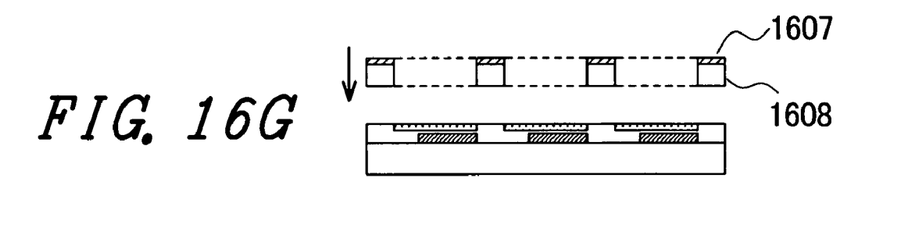
Figure 16H:
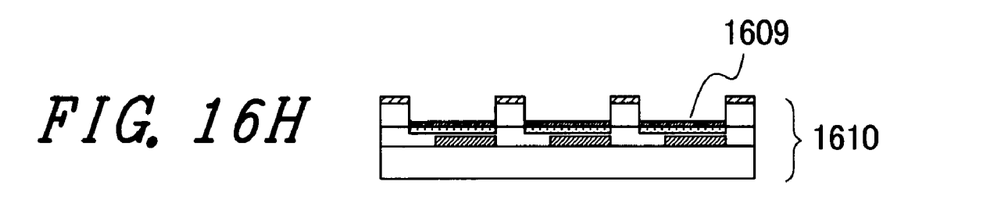
Figure 16I:
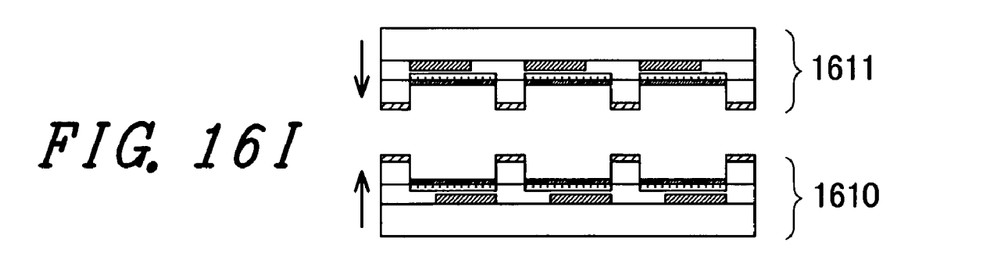
Figure 16J:
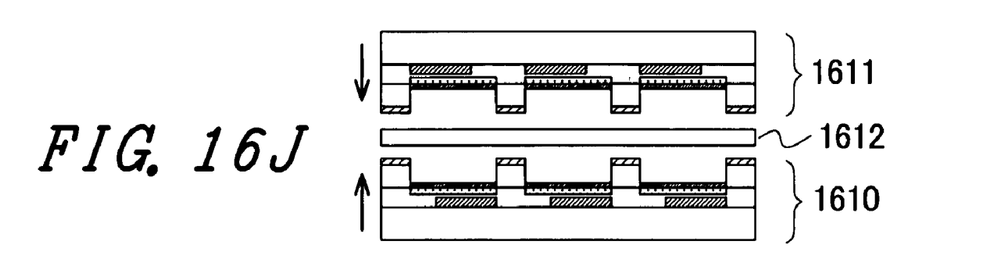

FIGS. 16a-16j are flowcharts for explaining one example of the manufacturing method of the light modulation element according to the present invention, wherein the steps advance in order of FIG. 16A→FIG. 16B→FIG. 16C→FIG. 16D→FIG. 16E→FIG. 16F→FIG. 16G→FIG. 16H→FIG. 16I or FIG. 16J.

An ITO layer having a thickness of 0.12 μm is formed on a glass substrate 1601 having a thickness of 1.1 mm using a sputtering method, and portions of the ITO layer is etched by a photolithography method to form transparent electrodes 1602.

A resist agent containing polyimide as a main component is applied to the glass substrate 1601 by coating using a spin coating method and, thereafter, the resist agent is baked at a temperature of 300° C. thus forming the insulation layer 1603 having a thickness of 0.4 μm.

Further, a resist agent is applied to the insulation layer 1603 by coating using a spin coating method and, thereafter, resist layers 1604 are formed by patterning at positions partitioned as pixels using a photolithography method. In such a state, the formed structure is exposed to plasma treatment 1605 with a $SF_6$ (sulfur hexafluoride) gas and, thereafter, the resist layers 1604 are removed thus acquiring patterned water repellant walls 1606.

By applying conductive polymer by coating, a polyimide film having a conductive layer on an upper surface thereof and having a thickness of 100 μm is formed, and holes are mechanically formed in the polyimide film in accordance with a pattern of pixels. Further, by exposing the polyimide film to plasma of an $O_2$ (oxygen) gas for several seconds thus enhancing the hydrophilic property of the polyimide film, partition walls 1608 each having a conductive layer 1607 are formed. The partition walls 1608 are fixed to the substrate using a photo curing resin in accordance with the pattern of the pixels. The conductive layers 1607 become electrodes of water filled within the partition walls 1608.

In the inside of the pixel surrounded by the partition walls 1608, oil in which dye or an ultraviolet absorbent is dissolved is ejected to form an oil layer 1609 having a thickness of 5 μm using an inkjet method or a dispenser method.

A display member 1610 which is produced in the above-mentioned manner and the display member 1611 which is produced in the same manner are gently immersed into water in a state that the display members 1610, 1611 face each other and the display members 1610, 1611 are sealed with a photo curing resin. Due to such steps, the light modulation element 109 shown in the embodiment 1 (FIG. 1) is produced.

Further, by sealing the display members 1610, 1611 with the photo curing resin in a state that an insulating transparent plate 1612 is inserted between the display member 1610 and the display member 1611, the light modulation elements 809, 909 explained in conjunction with the embodiment 2 (FIG. 8) or the embodiment 3 (FIG. 9) are manufactured. In this case, even when, in place of forming the conductive layer 1607 on the partition wall 1608, an ITO layer is formed on both surfaces of a transparent plate 1612 using a sputtering method to impart conductivity to both surfaces of the transparent plate, there arises no problem with respect to the manner of operation.

Oil and Dye used in the Light Modulation Element Explained in Conjunction with Embodiments 1 to 3

As a main component of the oils 102, 103 shown in FIG. 1, it is preferable to set n in alkane group $C_nH_{2n+2}$ (chained saturated hydrocarbon) to 10 to 16 (n=10 to 16). To seal a visible light region, dye (pigment) which is obtained by mixing Rhodamine B, Malachite Green, Victoria Blue (or Induline) or the like which is described in a catalogue of Tokyo Kasei Kougyou Ltd. may be used. As an additive for shielding (absorbing) near ultraviolet rays to ultraviolet rays, 2,4-hydroxybenzophenone, 2-(2'-hydroxy-5'-t-butylphenyl) benzotriazole or the like can be used.

Embodiment 4

Figure 10:
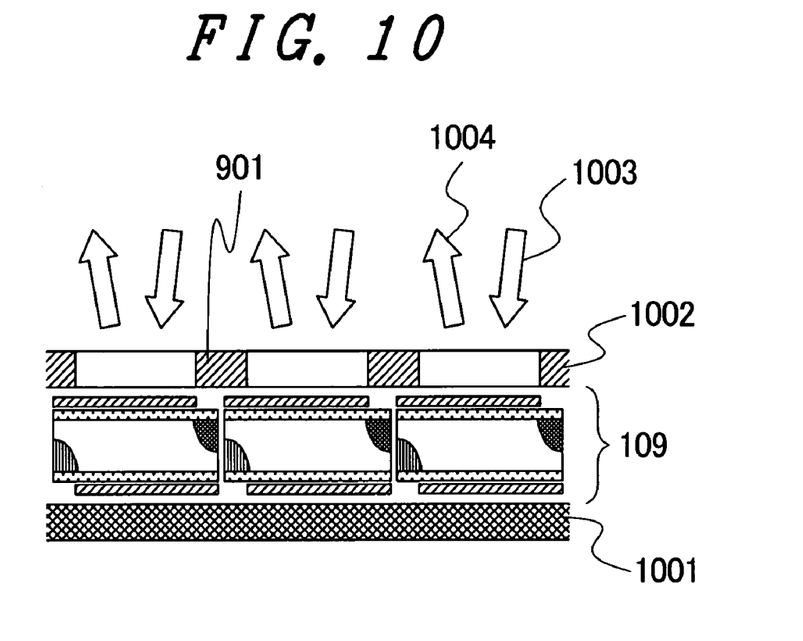
FIG. 10 is a view showing the basic constitution of the image display device which uses a light modulation element 109 according to the present invention.

FIG. 10 is a view showing the basic constitution of an image display device which uses the light modulation elements 109 according to the present invention.

A point which makes this embodiment 4 different from the embodiment 1 lies in that a reflector 1001 is arranged below the light modulation elements 109, and color filters 1002 of red (R), green (G), blue (B), for example are arranged on the light modulation element 109. Due to such a constitution, an external light 1003 passes through the color filters 1002 and is incident on the light modulation elements 109 and, thereafter, is reflected on the reflector 1001 thus forming a reflection light 1004. A light quantity of the reflection light 1004 is modulated by the light modulation element 109. Due to the above-mentioned operations, an image can be displayed.

Here, in this embodiment, the color filters 1002 and the reflector 1001 are applied to the light modulation element 109 of the embodiment 1. However, in place of the light modulation element 109 of the embodiment 1, even when the color filters 1002 and the reflector 1001 are applied to any one of the above-mentioned light modulation element 809 of the modification of the embodiment 1 or the embodiment 2, the light modulation element 909 of the embodiment 3 or modifications of these light modulation elements, these applications fall within a category of this embodiment.

Embodiment 5

Figure 11:
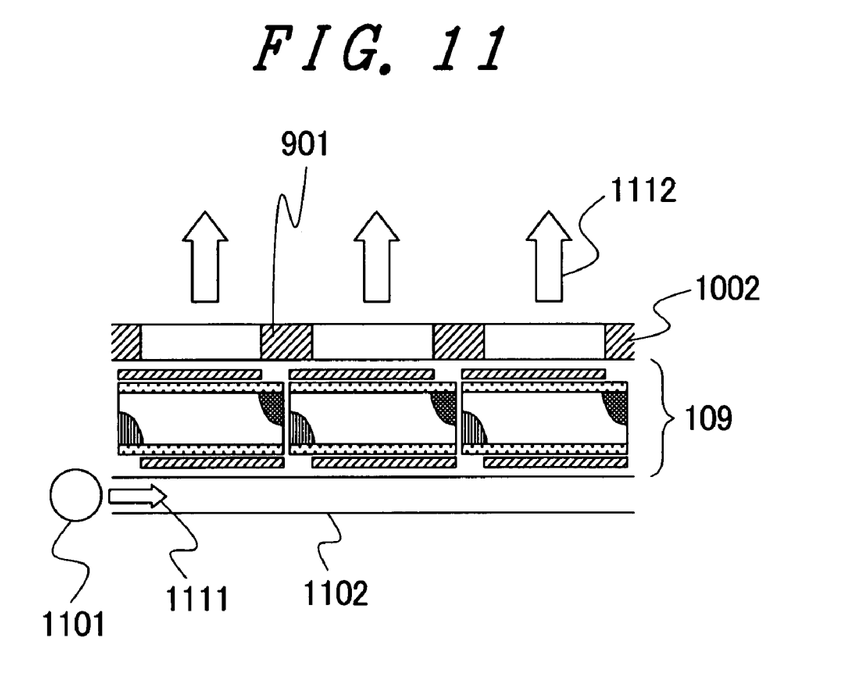
FIG. 11 is a view showing another basic constitution of the image display device which uses a light modulation element 109 according to the present invention.

FIG. 11 is a view showing another basic constitution of the image display device which uses the light modulation element 109 according to the present invention.

A point which makes this embodiment 5 different from the embodiment 1 lies in that a light source 1101 and a light guide plate 1102 are arranged below the light modulation element 109, and color filters 1002 are arranged on the light modulation elements 109. Due to such a constitution, an incident light 1111 from a light source 1101 passes through the light guide plate 1102 and is incident on the light modulation elements 109, and passes through the color filters 1002 to form a radiation light 1112. A light quantity of the radiation light 1112 is modulated by the light modulation elements 109. Due to the above-mentioned operations, an image can be displayed.

Here, in this embodiment, the light source 1101, the light guide plate 1102 and the color filers 1002 are applied to the light modulation element 109 of the embodiment 1. However, in place of the light modulation element 109 of the embodiment 1, even when the light source 1101, the light guide plate 1102 and the color filers 1002 are applied to any one of the above-mentioned light modulation element 809 of the modification of the embodiment 1 or the embodiment 2, the light modulation element 909 of the embodiment 3 or modifications of these light modulation elements, these applications fall within a category of this embodiment.

Embodiment 6

Figure 12:
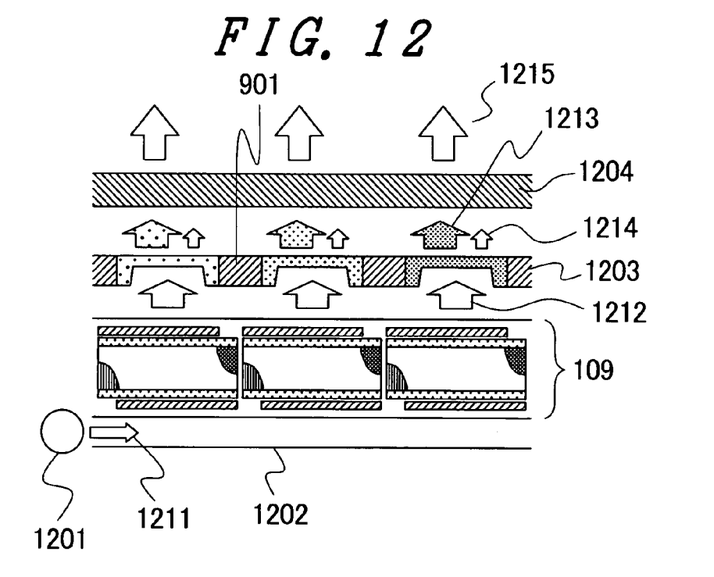
FIG. 12 is a view showing another basic constitution of the image display device which uses a light modulation element 109 according to the present invention.
Figure 15A:
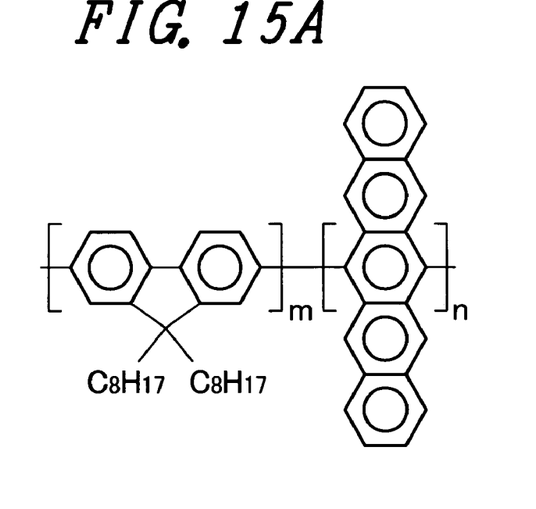
FIG. 15A to FIG. 15C are views showing the structural formulae of high polymer organic electro luminescence materials.
Figure 15B:
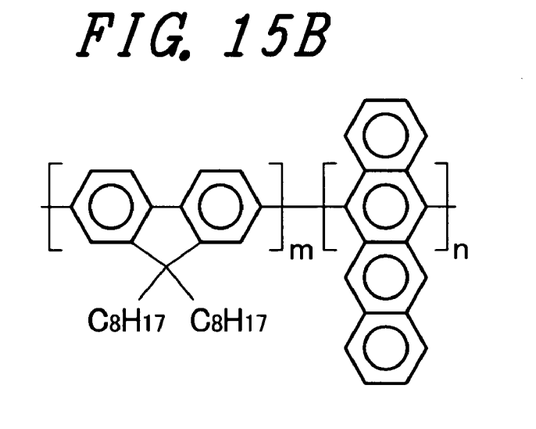
Figure 15C:
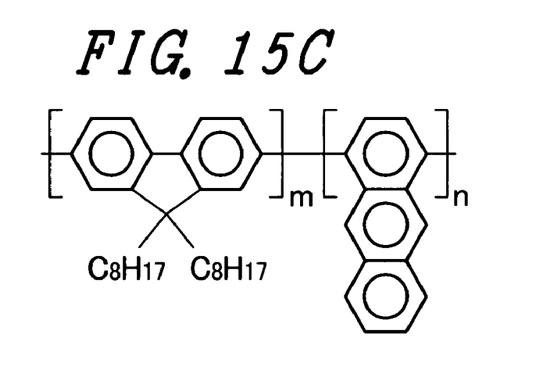

FIG. 12 is a view showing another basic constitution of the image display device which uses the light modulation elements 109 according to the present invention. FIG. 15A to FIG. 15C is a view showing structural formulae of polymer organic electroluminescence materials.

Below the light modulation elements 109, a light source 1201 having a wavelength band ranging from a near ultraviolet region to an ultraviolet region and a light guide plate 1202 are arranged, while above the light modulation elements 109, color conversion filters 1203 and absorption films 1204 are arranged. Due to such a constitution, an incident light 1211 from the light source 1201 is incident on the light modulation elements 109 through the light guide plate 1202. The transmission light 1212 which passes through the light modulation element 109 reaches the color conversion filters 1203 to form a converted light 1213 whose color is converted and a residual light 1214 whose color is not converted. Here, a color conversion filter 1203 contains low molecular or polymer organic electroluminescence (organic EL) materials, and can convert the light into a visible light region by absorbing light ranging from the near ultraviolet region to the ultraviolet region. For example, with the use of poly fluorene-based polymer shown in FIG. 15A, light ranging from the near ultraviolet region to the ultraviolet region is absorbed and the light in a wavelength of the red (R) is radiated. Further, with the use of poly fluorene-based polymer shown in FIG. 15B, light having a wavelength region of green (G) is radiated, and with the use of poly-fluorene-based polymer shown in FIG. 15C, light having a wavelength region of blue (B) is radiated. The absorption films 1204 absorb the residual light 1214 and, eventually, the converted light 1213 is radiated to form the radiation light 1215. A light quantity of the radiation light 1215 depends on the light quantity of the transmission light 1212 and hence, the light quantity of the radiation light 1215 is indirectly modulated by the light modulation element 109. Due to the above-mentioned operations, an image can be displayed.

Further, in the organic EL materials shown in FIG. 15A to FIG. 15C can, as being well known, emit light also due to the injection of an electric current. However, in this case, there arise drawbacks such as a drawback (1) that it is necessary to form thin layers such as light emitting layers with the extreme flatness, a drawback (2) that highly accurate mask is necessary for every color at the time of manufacturing using a vacuum vapor deposition method, a drawback (3) that a quantum efficiency is low and hence, it is necessary to allow a large quantity of current to flow whereby the deterioration of elements attributed to the Joule's heat is liable to be generated. With the use of the method shown in FIG. 12 which generates the excitation with the light ranging from the near ultraviolet region to the ultraviolet region, the drawback on the deterioration of the elements attributed to the Joule's heat can be obviated. Further, it is unnecessary to apply the electric current and hence, the flatness of the light emitting layer may be alleviated thus allowing the use of an inkjet method as a manufacturing method. With the use of the inkjet method, no restriction is imposed on a mask size thus facilitating the large-sizing of a screen size.

Here, in this embodiment, the light source 1101, the light guide plate 1102, the color conversion filers 1203 and the absorption films 1204 are applied to the light modulation element 109 of the embodiment 1. However, in place of the light modulation element 109 of the embodiment 1, even when the light source 1101, the light guide plate 1102, the color conversion filers 1203 and the absorption films 1204 are applied to any one of the above-mentioned light modulation element 809 of the modification of the embodiment 1 or the embodiment 2, the light modulation element 909 of the embodiment 3 or modifications of these light modulation elements, these applications fall within a category of this embodiment.

What is claimed is:

1. An image display device comprising a first substrate, a second substrate which faces the first substrate, and a plurality of pixels, wherein
   a first insulation layer and first electrodes which are disposed under the first insulation layer are formed on the first substrate,
   a second insulation layer and second electrodes which are disposed under the second insulation layer are formed on the second substrate,
   each of the pixels has one of the first electrodes, one of the second electrodes, and an area which is surrounded by the first insulation layer, the second insulation layer, and partition walls each having a conductive layer,
   a first oil layer and a second oil layer include oil of a nonpolar material, and are formed in the area,
   the first oil layer is disposed at a side of the first insulation layer,
   the second oil layer is disposed at a side of the second insulation layer,
   an ON voltage or an OFF voltage is applied to the first electrode and the second electrode,
   the first insulation layer has a first region which overlaps the first electrode and a second region which does not overlap the first electrode as viewed in a direction from the display screen,
   the second insulation layer has a third region which overlaps the second electrode and a fourth region which does not overlap the second electrode as viewed in a direction from the display screen, and
   the second region and the fourth region of each of the pixels do not overlap each other as viewed in a direction from the display screen.

2. An image display device according to claim 1, wherein the first substrate has a plurality of first data lines, a plurality of first selection lines, and a plurality of first thin film transistors each having a first gate electrode,
   the second substrate has a plurality of second data lines, a plurality of second selection lines, and a plurality of second thin film transistors each having a second gate electrode, the first gate electrode is connected with one of the first selection lines and the second gate electrode is connected with one of the second selection lines, the first data lines are connected with the first electrodes via one of the first thin film transistor respectively, the second data lines are connected with the second electrodes via one of the second thin film transistor respectively, a selection signal which selects one of the pixels is inputted to each of the first selection lines and the second selection lines, a first data signal is inputted to the first data lines, the first data signal applying the ON voltage or the OFF voltage to the first electrodes, and a second data signal is inputted to the second data lines, the second data signal applying the ON voltage or the OFF voltage to the second electrodes.

3. An image display device according to claim 1, wherein the first oil layer is disposed on the second region when the ON voltage is applied to the first electrode, the second oil layer is disposed on the fourth region when the ON voltage is applied to the second electrode.

4. An image display device according to claim 1, wherein in a state which the ON voltage is applied to one electrode of the first electrode and the second electrode, and the OFF voltage is applied to the other electrode of the first electrode and the second electrode, the ON voltage applied to the one electrode changes into the OFF voltage at a first timing and the OFF voltage applied to the another electrode changes into the ON voltage at a second timing, and the first timing and the second timing differ from each other.

5. An image display device according to claim 4, wherein a gray scale of the pixel is controlled by a time difference between the first timing and the second timing.

6. An image display device according to claim 1, wherein the ON voltage is applied to one electrode of the first electrode and the second electrode, and the OFF voltage is applied to the other electrode of the first electrode and the second electrode when the image display device is started.

7. An image display device according to claim 1, wherein the first oil layer and the second oil layer include light blocking dye.

8. An image display device according to claim 1, wherein a water layer is formed in the area.

9. An image display device according to claim 1, wherein the partition wall is made of a resist material.

10. An image display device according to claim 1, wherein the area is partitioned into a first area and a second area by an insulation member, the first area has the first oil layer and the second area has the second oil layer.

11. An image display device according to claim 1, wherein the second region of one of the pixels overlaps the fourth region of another of the pixels which is adjacent to the one.

12. An image display device according to claim 11, wherein a black matrix is formed where the second region of the one overlaps the fourth region of the another.

13. An image display device according to claim 1, wherein a reflector is disposed on a surface of the second substrate, the surface being opposite to the second oil layer.

14. An image display device according to claim 1, wherein a light source is disposed at a side of the second substrate, the side being opposite to the second oil layer.

15. An image display device according to claim 1, wherein color filters are formed on one substrate of the first substrate and the second substrate.

16. An image display device according to claim 1, wherein color conversion filters are disposed at a side of the first substrate, the side being opposite to the first oil layer, the color conversion filters absorb a light ranging from a near ultraviolet region to a ultraviolet region.

17. An image display device according to claim 16, wherein the color conversion filters contain an organic electroluminescence material.

* * * * *